July 4, 1972 M. N. SCHWEIZER ET AL 3,674,324
SELF-LUBRICATED SHAFT BEARING FOR LINEAR AND ROTARY MOTION
Filed Oct. 28, 1970 2 Sheets-Sheet 2
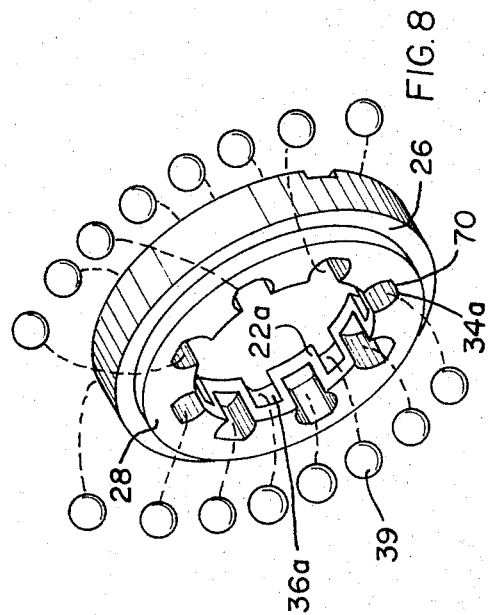
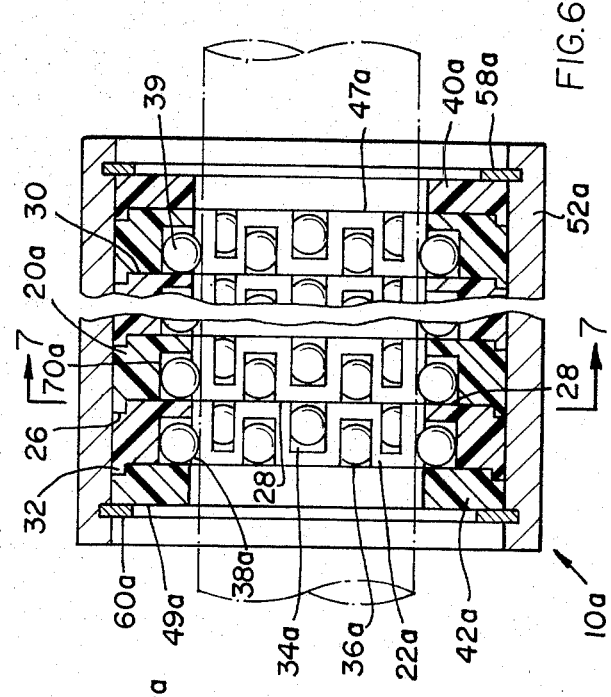
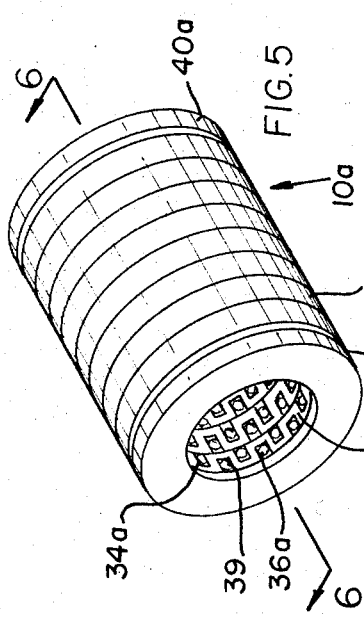
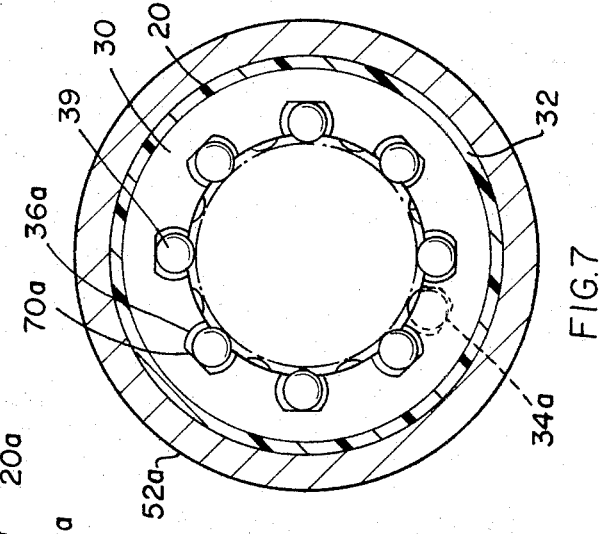
INVENTOR.
MAX NORMAN SCHWEIZER
ARTHUR STONE MORAN
BY Edward H. Loverman
ATTORNEY United States Patent Office 3,674,324
Patented July 4, 1972

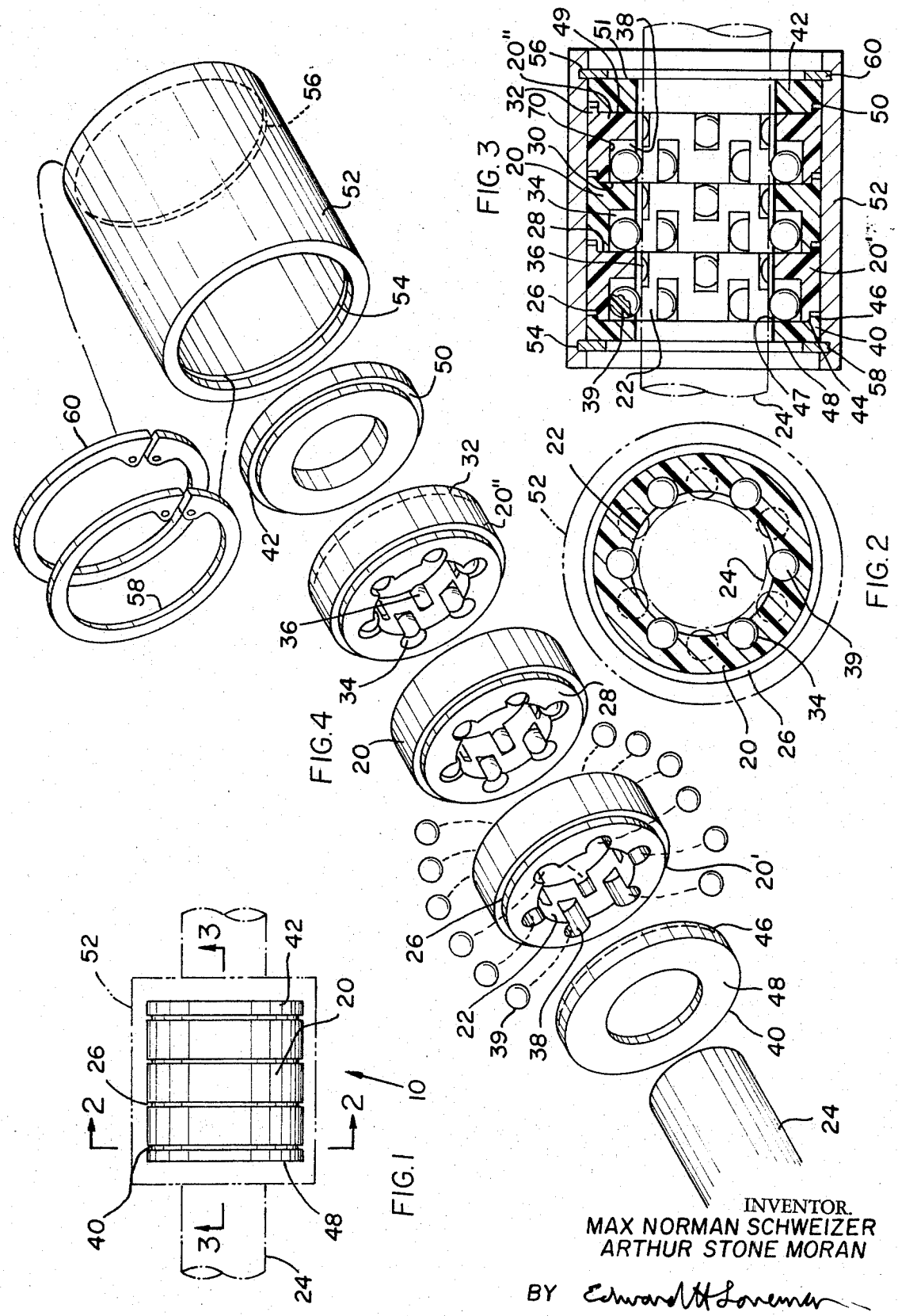

3,674,324
SELF-LUBRICATED SHAFT BEARING FOR
LINEAR AND ROTARY MOTION
Max Norman Schweizer, 110 S. Clinton Ave., Bay Shore, N.Y. 11706, and Arthur Stone Moran, Parsens Lane, St. James, N.Y. 11780
Filed Oct. 28, 1970, Ser. No. 84,838
Int. Cl. F16c 31/04
U.S. Cl. 308—6 R 11 Claims

ABSTRACT OF THE DISCLOSURE

A ball bearing assembly for linear and rotatable motion having one or more flat annular bearing cages having a central passage to receive a shaft. Each bearing cage has a plurality of circumferentially spaced cylindrical cavities extending axially of the ring from opposite ends and each cavity has a lateral opening into the central passage. A spherical ball is rotatably disposed in each of the cavities and projects laterally through the opening into the passage. The cavities are axially longer than the diameters of balls to permit the balls to move therein axially of the ring. Spacer rings at opposite ends of the assembly hold the balls in the cavities. The bearing and spacer rings and balls may be made of smooth, self lubricating fiberous polymer material to minimize friction.

This invention relates to the ball bearing devices, and more particularly concerns a self-lubricated ball bearing device for supporting a shaft which is subject to linear motion as well as rotary motion.

Heretofore ball bearing devices have employed hardened steel balls rotatably secured in steel or bronze bearing cages. Such devices were generally adapted for supporting a shaft subject to rotary motion. Others were best adapted for supporting a shaft subject to reciprocating, linear, or axial motion but all required precision balls, extreme cleanliness and proper lubrication.

The present invention is directed at a ball bearing device in which either the balls or bearing cages or both are formed of a self lubricating material such as nylon, a polyfluoro carbon, or other thermoplastic. This material may be characterized as having a smooth, slippery surface, dimensional stability, toughness, rigidity, noncorrosiveness, resistance to chemical decomposition, thermal, acoustic and electrical insulating properties, lightness in weight, and relative economy in manufacture. It may be easily molded to fairly precise dimensions and may be further machined if adjustments in shape are required.

In accordance with the invention the ball bearing device may be assembled by interposing one or more bearing cages between a pair of end spacer rings. The bearing cages have cylindrical cavities on opposite sides disposed in circumferentially staggered arrays in which self lubricated spherical synthetic thermoplastic balls freely rotate. The diameters of the balls is less than the axial length of the cylindrical cavities so that the balls may rotate in the cavities and move in the cavities axially thereof. The balls project into a central cylindrical bore or passage to support a rotary and/or axially movable shaft. The entire bearing assembly may be put together without special tools or any of the other complex methods used in assembling conventional metal bearings.

It is therefore a principal object of the present invention to provide a ball bearing device wherein either the bearing cage or balls or both are made of a self-lubricated thermoplastic material and wherein the cage has a plurality of cylindrical cavities in staggered array on opposite sides with the balls rotatably disposed in the cavities and movable axially thereof.

Another object of the present invention is to provide a ball bearing assembly comprised of a pair of bearing rings between which is one or more bearing cages having circumferentially spaced cavities on opposite sides containing balls and wherein the cages or balls or both are made of a self-lubricated thermoplastic material.

A further object of the present invention is to provide a bearing assembly of the type described, wherein the cavities are disposed in staggered array on opposite sides, the cavities being cylindrical and axially longer than the diameter of the balls so that the balls are movable axially in the cavities.

Another object of the present invention is to provide a bearing assembly of the type described wherein all the cavities are open laterally into a central hole or bore in the cage which is adopted to receive a shaft for axial and rotary motion, the balls all projecting into the central hole or bore to bear on the shaft.

These and other objects and many of the attendant advantages of this invention will be readily appreciated as the same becomes better understood by reference to the following detailed description when considered in connection with the accompanying drawings in which:

FIG. 1 is a side elevational view of a bearing assembly embodying the invention, with a casing therefor and a supported shaft shown in dotted lines;

FIG. 2 is a cross sectional view taken along line 2—2 of FIG. 1;

FIG. 3 is an enlarged axial sectional view of the entire bearing assembly including casing, but with the supported shaft shown in dotted lines;

FIG. 4 is an exploded perspective view of the parts of the bearing assembly of FIG. 1;

FIG. 5 is a perspective view of another bearing assembly embodying the invention;

FIG. 6 is an enlarged axial sectional view taken along line 6—6 of FIG. 5;

FIG. 7 is a reduced cross sectional view taken along the line 7—7 of FIG. 6; and FIG. 8 is a perspective view of a single cage and balls which form a part of the assembly of FIGS. 5 and 6.

Referring, now to the drawings wherein like reference characters designate like or corresponding parts throughout, there is illustrated in FIGS. 1–4 a bearing assembly generally designated as reference numeral 10 comprising a plurality of bearing cages 20, each formed with a central axial bore, hole or passage 22 through which a cylindrical shaft 24 may be axially extended for support by the bearing assembly 10. A circumferential recess or rabbet 26 is formed in an end face 28 of each ring 20 with the opposite end face 30 recessed to defined a cylindrical lip 32. A plurality of cylindrical cavities 34, 36 are formed in respective opposite ends of the cage 20. The cavities are spaced circumferentially apart with the cavities 34 staggered circumferentially with respect to the cavities 36, i.e., each cavity 34 is located axially of the cage 20 between two of the cavities 36 and vice versa. The cavities 34 and 36 are located at the inside of the cage 20 and each have a lateral opening 38 communicating with the central passage 22. In each of the cavities 34 and 36 is a spherical ball 39 whose diameter is slightly smaller than the diameter of the cavity but which projects laterally out of the cavity into the passage 22 through the lateral opening 38 as clearly illustrated in FIGS. 2 and 3. The lateral width of the opening 38 is smaller than the diameter of the ball 39 to retain the ball in the cavity. The axial length of each cavity is larger than the diameter of the ball 29 to permit axial movement of the ball in the cavity as well as rotational movement therein.

The cages 20 nest or interfit together with each of the inner end faces 28 abutting the end face 30 of an adjacent cage. A pair of spacer rings 40, 42 are applied to opposite ends of the assembly of cages with the spacer ring 40 formed with a recess 44 defining a circumferential lip 46 which interfits with the rabbet 26 of an end cage 20' and spacer ring 42 formed with a peripheral rabbet 50 which receives the cylindrical lip 32 of an edge cage 20" An end face 48 of the ring 40 and an end face 51 of the ring 42 are flat and annular.

A cylindrical casing 52 of metal or plastic may enclose the assembly of bearing cages. This casing may have inner circumferential grooves 54, 56 near opposite ends of the casing 52 to respectively receive a conventional C-ring 58, 60 which abuts the outer end faces 48 and 51 of the respective spacer rings 40 and 42. This completes the assembly of the bearing device.

The cylindrical shaft 24 extending axially through the bearing assembly will be circumferentially supported by contact with the balls 39 which also contact the outermost wall 70 of each cavity during rotational motion of the shaft. When the shaft is linearly moved (axially), each ball has three points of contact, i.e., the shaft, the outermost wall 70 of each cavity and either an end face (28 or 30) or a face (47 or 49) of the respective rings 40, 42. The shaft may thus move axially and or rotationally and the balls are capable of both rotational as well as axial movement in the cavities. Friction is minimized between the balls and shaft when the balls 39 are made of a self lubricated nonporous synthetic thermoplastic, e.g. nylon or acetal fluorocarbon (Deldrin), etc. or if the cages are made of this material or both cages and balls may be made of this type of plastic material. If desired the spacer rings 40, 42 may also be made of the same material.

It will be apparent that a bearing assembly may be made up using a single bearing cage or it may have two, three or more bearing cages. The three cages illustrated in FIGS. 1-4 are only exemplary of the number of cages an assembly may contain. It will be noted that no tools are required for inserting the balls in the cavities or the cages in the casing. Assembly and disassembly are thus quick and easy and allow for replacing parts or interchanging balls and rings at will.

FIGS. 5-8 show another bearing assembly generally designated as reference numeral 10a in which parts corresponding to those of the bearing assembly 10 are identically numbered. In the assembly 10a eight bearing cages 20a are shown (FIG. 5) although it will be understood that more or less cages may be provided. Cylindrical cavities 34a, 36a are formed at opposite ends of each of the cages 20a in arrays which are staggered, i.e., spaced apart circumferentially of the cage and with each of the cavities having an outer end face 70a (FIG. 7) which is concentric with the circumference of the central bore 22. The cavities are diametrically larger than the balls 39 and are also axially longer thereby permitting free movement of each of the balls, e.g. rotationally as well as circumferentially and axially of the cage. It will be noted that the width of each of the lateral openings 38a is slightly smaller than the diameter of the ball (in the direction circumferentially of the cage) thus retaining the ball in the cage while permitting it to project laterally into the central hole, bore or passage 22a. Eight balls and respective cavities are provided on each side of each cage, however, more or less balls and cavities may be provided. For example, as illustrated in FIGS. 1, 2, and 4 the cage 20 has six cavities and six balls on each side but other numbers of balls and cavities may be provided.

In the rings 20 of the assembly 10, the cavities 34, 36 each extend axially about one half of the thickness of the cage between end faces 28, 30. In cages 20a, the cavities 34a and 36a are axially longer than one half the thickness of the cage thereby enabling the cage 20a to be thinner than the cage 20. Obviously, the cages 20 will be somewhat stronger than the cages 20a if the same size ball 39 is used for both cages since the cage 20 is thicker and more massive. Either the cages or the balls of the assembly 10a or both may be made of self-lubricated thermoplastic material as previously discussed in connection with the assembly 10. The spacer rings 40a and 42a are applied to opposite end rings of the assembly 10a as in the assembly 10. Casing 52a and the C rings 58a, 60a may be employed to enclose the assembly as shown in FIG. 6. The shaft will be supported by the balls 39 in the bearing assembly 10a which balls have two points of contact during shaft rotation (the shaft and the wall 70a) and three points of contact (the shaft, the wall 70a and the side wall ((28 or 30)) or the face 47a or 49a of the respective rings 40a, 42a) when the shaft is moved axially.

If desired the cavities 34a and 36a of the assembly 10a may be constructed like the cavities 34 and 36 of the assembly 10, with the sides 70a concave and cylindrical as wall 70 of the assembly 10 rather than being concentric with the circumference of the central bore 22. In all constructions the cavities are open at one end face of the cage to permit insertion of the balls, and in all constructions the lateral openings in each of the cavities is smaller than the diameter of the balls to retain the ball in the cavity while permitting free movement therein.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A self-lubricating ball bearing assembly for an axially movable and rotatable shaft comprising:
   at least one flat annular bearing cage having a central axial passage to receive a shaft, and a plurality of circumferentially spaced cylindrical cavities inside of said cage and extending axially thereof, each of said cavities having a lateral opening communicating with said passage;
   a plurality of spherical balls each one of which is disposed in one of said cavities;
   the width of each of said openings circumferentially of said ring being less than the diameter of one of said balls to retain said balls in said cavities respectively with each of said balls projecting radially into said passage for contacting and supporting said shaft;
   said cavities being axially longer than the diameter of each of said balls housed therein whereby said balls are rotatable in each of said cavities and are movable therein axially of said cage upon movement of said shaft, said cavities being open at ends of said cage for insertion of said balls therein, said cage, or said balls or both being made of a nonporous, rigid thermoplastic material having a smooth, slippery, self-lubricated surface whereby friction is minimized between said shaft, said balls and said cage.

2. A ball bearing assembly as defined in claim 1 further comprising annular spacer rings at opposite ends of said bearing cage to retain said balls in said cavities.

3. A ball bearing assembly as defined in claim 2, wherein said bearing cage and said spacer rings are formed with interfitting parts so that said bearing cage and said spacer rings engage each other in end to end relationship.

4. A ball bearing assembly as defined in claim 1, wherein said cavities on one end of said bearing cage are circumferentially spaced alternately from said cavities on the opposite end of said bearing cage to maximize the strength of said bearing cage.

5. A ball bearing assembly as defined in claim 4 wherein said cavities at each end of said bearing cage are axially longer than one half the axial length of said bearing cage to minimize the thickness of said cage.

6. A ball bearing assembly as defined in claim 4, wherein each of said cavities has an outer side concentric with said central axial passage against which said ball therein bears and wherein each of said cavities is diametrically larger than said ball therein, so that surface contact between said ball and the sides of said cavity in which it is inserted is minimized.

7. A ball bearing assembly as defined in claim 3, further comprising a cylindrical casing having open opposite ends for passing said shaft therethrough, said casing circumferentially enclosing said bearing cage and said spacer rings and means at outer ends of said spacer rings retaining said bearing cage and said spacer rings in said casing.

8. A ball bearing assembly as defined in claim 1 further comprising at least one other flat annular bearing cage juxtaposed endwise to the first named bearing cage, said other bearing cage having another central axial passage to receive said shaft, said other bearing cage having another plurality of circumferentially spaced cylindrical other cavities extending axially thereof, said other cavities having other lateral openings communicating with said other passage; and a plurality of other spherical balls disposed in said other cavities respectively, the width of said other openings circumferentially of said other bearing cage being less than the diameters of said other balls to retain the same in said other cavities with said balls projecting radially into said other passage, said other cavities being axially longer than the diameters of said other balls so that said balls are rotatable in said other cavities and are movable therein axially of said bearing cage said other cavities being open at ends of said other cage for insertion of said other balls therein, said other cage or said balls or both being made of a nonporous, rigid thermoplastic material having smooth, slippery, self lubricated surfaces to minimize friction between said shaft, said balls, and said cages.

9. A ball bearing assembly as defined in claim 8, further comprising a pair of annular spacer rings respectively disposed at opposite ends of the juxtaposed bearing cages to retain said balls in said cavities in each of each cages respectively, said spacer rings being made of nonporous, rigid thermoplastic material having smooth, slippery, self-lubricated surfaces to minimize friction between said balls and adjacent sides of said spacer rings.

10. A ball bearing assembly as defined in claim 8, wherein said bearing cages and said spacer rings are formed with interfitting parts so that said bearing cages and said spacer rings engage each other in end to end relationship and said spacer rings are formed with interfitting, peripheral circumferential rabbets and lips so that said bearing cages and spacer rings nest within one another.

11. A ball bearing assembly as defined in claim 10, wherein said cavities on one end of said other cage are circumferentially spaced alternately from said cavities on the opposite end of said other cage to maximize the strength of said other cage.

References Cited

UNITED STATES PATENTS

| | | | |
|---|---|---|---|
| 2,911,268 | 11/1959 | Staunt | 308—201 |
| 980,932 | 1/1911 | Eitner | 308—201 |
| 3,353,876 | 11/1967 | Moyer | 308—6 R |
| 3,469,894 | 9/1969 | Stamm | 308—6 R |
| 2,286,422 | 6/1942 | Katcher | 308—201 |
| 3,143,758 | 8/1964 | Dunham | 308—6 R |
| 3,506,316 | 4/1970 | McKee | 308—201 |

FOREIGN PATENTS

| | | | |
|---|---|---|---|
| 359,964 | | France | 308—201 |
| 507,757 | 9/1920 | France | 308—201 |

MARTIN P. SCHWADRON, Primary Examiner

B. GROSSMAN, Assistant Examiner

U.S. Cl. X.R.

308—201